(No Model.) 2 Sheets—Sheet 1.
G. H. BADE.
STATION INDICATOR.

No. 367,580. Patented Aug. 2, 1887.

Witnesses,
Geo. H. Strong.
J. H. Torres

Inventor,
G. H. Bade
By Dewey & Co.
Attys (No Model.) 2 Sheets—Sheet 2.

G. H. BADE.
STATION INDICATOR.

No. 367,580. Patented Aug. 2, 1887.

Witnesses,
Geo. H. Strong
J. H. Nourse

Inventor
G. H. Bade
By Dewey & Co,
Att'y

UNITED STATES PATENT OFFICE.

GERRIT H. BADE, OF AUSTIN, NEVADA.

STATION-INDICATOR.

SPECIFICATION forming part of Letters Patent No. 367,580, dated August 2, 1887.

Application filed January 8, 1887. Serial No. 223,832. (No model.)

*To all whom it may concern:*

Be it known that I, GERRIT H. BADE, of Austin, county of Lander, and State of Nevada, have invented an Improvement in Station-Indicators; and I hereby declare the following to be a full, clear, and exact description thereof.

My invention relates to that class of indicators which are used in cars for automatically registering the names of the stations, distances, names of streets, &c., for the information of passengers; and my invention consists in a casing located in a suitable position in the car and having within it a clock-work mechanism with an escapement, a traveling ribbon or belt, upon which the names of the successive stations, streets, distances, &c., are delineated, a gong and a hammer, and mechanism set in operation by a fixed point without the car, either above or below or on each side, for effecting the operation of the clock-work mechanism, whereby the hammer is made to strike the gong and the traveling ribbon or belt is moved at required intervals, all of which, together with details of construction, I shall hereinafter fully describe by reference to the accompanying drawings, in which—

Figure 1:
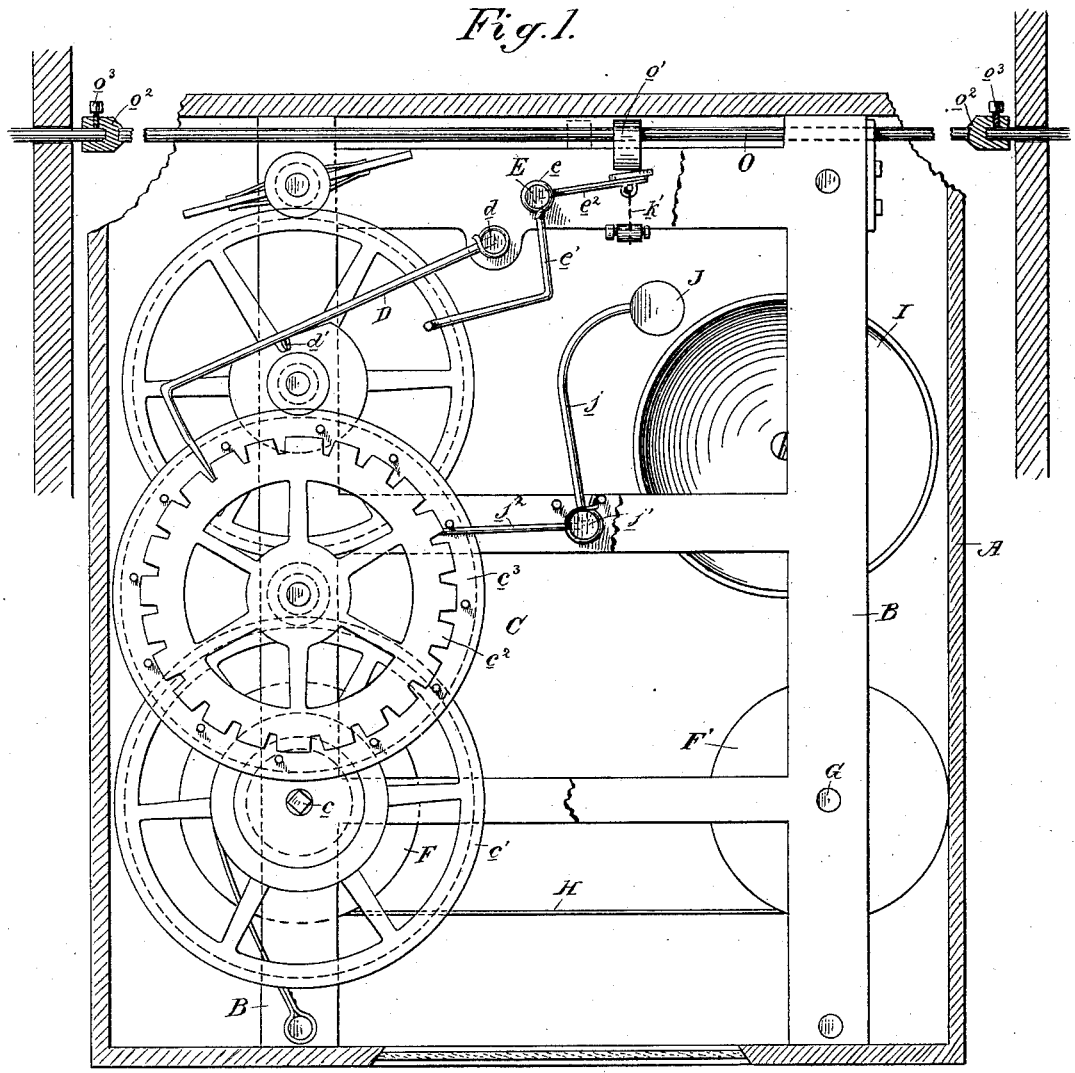
Figure 2:
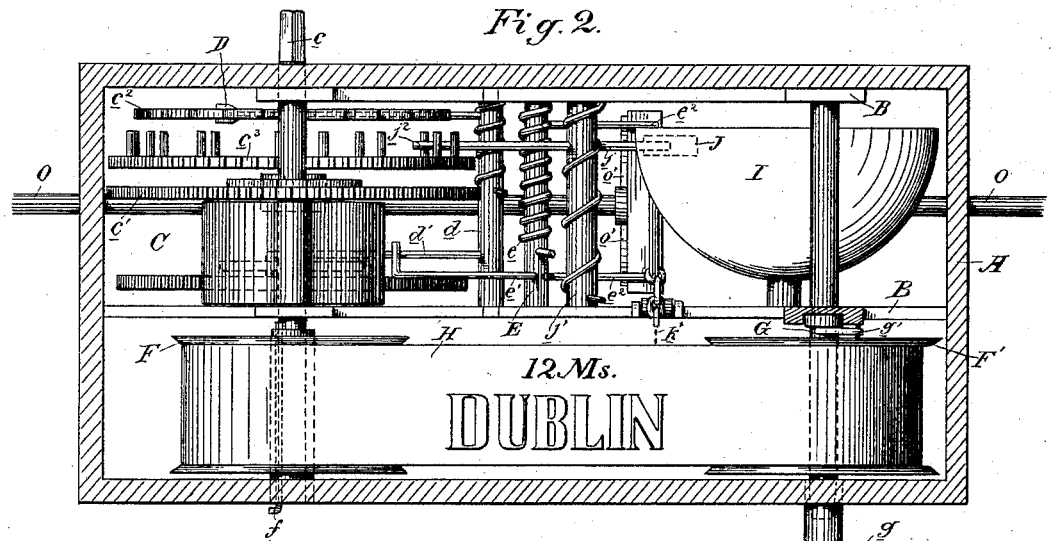
Figure 3:
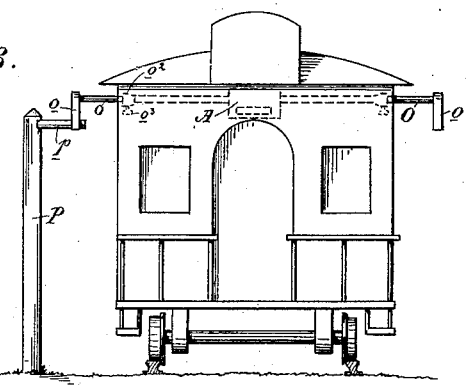
Figure 5:
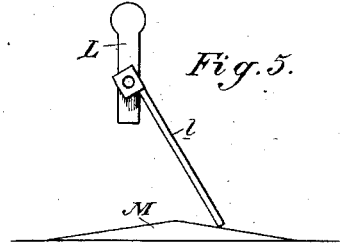
Figure 4:
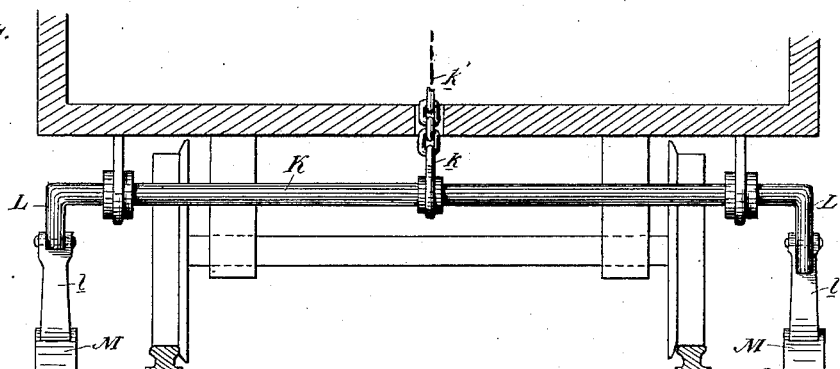

Figure 1 is a plan view of the interior mechanism of the indicator. Fig. 2 is a front view, the front plate of the casing being removed. Fig. 3 is an end elevation of a car, showing the engagement of the arms $o$ and $p$. Fig. 4 is a detail view showing the engagement of the arms L with obstructions below. Fig. 5 is a detail view of arm L and obstruction M.

The object of my invention is to provide a simple and effective station-indicator which is adapted to be operated by contact with a fixed point without, located in any suitable position, whether above or on each side of the track, or underneath in the roadway.

A is a casing located suitably in a car. Within this casing is a frame, B, in which is mounted the clock-work mechanism, which I have here designated generally by the letter C, and to which I need refer no further than to point out that $c$ is the mainspring-arbor, having gear $c'$, which, through intermediate gears and pinions, effects the rotation of the notched escapement-wheel $c^2$ and the hammer-operating pin-wheel $c^3$. The escapement-wheel is engaged and controlled by an arm or pawl, D, which is secured to a rock-shaft, $d$, which has a second arm, $d'$, as shown in Fig. 2.

E is a rock-shaft which is influenced by a spring, $e$, to its normal position and carries an arm, $e'$, which, when said shaft is rocked, is adapted to bear against the arm $d'$ and to rock its shaft $d$, whereby the arm or pawl D is thrown from its engagement with the escapement-wheel and the clock mechanism thereby allowed to operate until the re-engagement of the arm or pawl takes place. The arbor or shaft $c$ of the mainspring is lengthened and carries a drum, F, opposed to which is another drum, F', mounted on a shaft, G, which carries a crank, $g$, Fig. 2.

H is a belt or ribbon carried by the drum F' and having its end adapted to be hooked over a button or otherwise fastened to the drum F, so that it may be wound upon said latter drum and unwound from the former. Upon this belt or ribbon are delineated in proper manner the names of the successive stations, their distances, &c., or, when the indicator is used in a street-car, the belt or ribbon will carry the names of the successive streets.

Within the casing is a gong, I, which is adapted to be struck by the hammer J, the shank or handle $j$ of which is connected with a rock-shaft, $j'$, from which an arm, $j^2$, extends to and is adapted to be successively engaged by the pins of the pin-wheel $c^3$, heretofore mentioned, Fig. 1.

Now, the operation of the indicator as far as described is as follows: By oscillating the spring-controlled shaft E its arm $e'$ is brought into contact with the arm $d'$ of the rock-shaft $d$, whereby the pawl D of said shaft is raised from its engagement with the escapement-wheel $c^2$, thereby allowing the power of the spring to be exerted for the rotation of the pin-wheel $c^3$, which, acting against the arm $j^2$ of the rock-shaft $j'$, to which the hammer is attached, causes said hammer to strike the gong, whereby warning is given and the attention of the passengers attracted to the simultaneous movement or change of the ribbon or belt, which takes place by the movement of the main arbor $c$, and is observed through a suitable opening in the outer casing, A. When the car has reached its destination, it is obvious that the belt or ribbon will be wound upon the drum F. Now, in order to unwind it again from said drum, I connect the drum with the arbor by a removable connection—such as a key, $f$—whereby the drum may be thrown out of gear with the arbor, thereby allowing it to turn freely when the ribbon is being unwound from it. Having disconnected drum F from its arbor, the crank-shaft G is rotated, so that the ribbon is wound back again upon the drum F'. This unwinding of the ribbon takes place at the end of the route and may be accomplished by hand in suitable manner. After the ribbon has been rewound on the drum F', said drum is removed for the substitution of a new one carrying another ribbon, with the stations, distances, streets, &c., properly arranged upon it for the return-trip. This removal of drum F', I accomplish by having the crank $g$ removable from the shaft G and having said shaft held to its place by a spring, $g'$, bearing against its upper end and holding it to its seat, Fig. 2. By relieving it of its spring and removing the crank $g$ the shaft G and drum F' may be removed from the casing and another drum inserted, the ribbon of which is then hooked onto the button of drum F, which is again keyed to its arbor, and the indicator is ready for the return-trip. When the indicator is located in a position in the car suitable for the purpose, I prefer to operate it from the road-bed below, Figs. 4 and 5. This I accomplish by means of a rock-shaft, K, mounted under the car and having a crank, $k$, from which a cord, chain, or cable, $k'$, extends upwardly through the bottom of the car and is connected with a crank-arm, $e^2$, on the spring-actuated rock-shaft E, by which the escapement is operated, Fig. 1. The ends of the rock-shaft K under the car are provided with downwardly-extending arms L, which are adapted to come in contact with any suitable obstruction, M, placed in the roadway. This obstruction may be an inclined plane, or of any other character. I have here shown it as being located on each side of the roadway, outside of the rails of the track. I may, however, locate it in the center of the roadway or elsewhere upon the ground.

It will be observed that the arms L, which extend downwardly from the rock-shaft K, are jointed by a hinge, $l$, of such a character that the joint will give but in one direction, which said direction is reversed in the two arms of the rock-shaft. This is for the purpose of making one of the arms remain rigid and perform its function when the car is going in one direction, but allowing it to give when the car is going in the other direction, thereby avoiding the operation of the indicator when the car is going back. When the arm L comes in contact with the obstruction, the rock-shaft K is oscillated, so that through its crank $k$ and connecting-chain $k'$ the rock-shaft E in the indicator above is oscillated, whereby the escapement is effected, and the operation of the indicator takes place, as before explained. In some cases—as, for example, when the indicator is placed in the center of the car and it is given two faces, whereby its movements may be observed from each end—it is obvious that it may be impracticable to operate it from below, as I have previously described. In such a case I would operate it from above by means of the transverse shaft O, passing through the sides of the car and provided with arms or cranks $o$ on each end, which are adapted to come in contact with fixed arms $p$ on posts P, fixed beside the roadway, Fig. 3. The shaft O carries a cam or crank-arm, $o'$, Fig. 1, which bears against the crank-arm $e^2$ of the spring-actuated shaft E, by which the escapement is effected, and therefore when one of the arms $o$ comes in contact with the fixed arm $p$ and the transverse shaft O is thereby rocked the operation of the indicator is effected, as before described.

In order that the arms $o$ on each side shall work properly when the car is going in either direction, I construct said shaft O, as shown, by dividing it in sections, the outer sections, which carry the arms, fitting in a socket, $o^2$, in the inner section, and secured therein by a set-screw, $o^3$, so that I am enabled by tightening the screw on one side to make the arm on that side operative, and by loosening the screw on the other side to throw its arm out of action.

Having thus described my invention, what I claim as new, and desire to secure by Letters Patent, is—

1. In a station-indicator, the clock-work mechanism having the mainspring-arbor and the escapement-wheel controlled by a pawl, in combination with the drum F on the mainspring-arbor, the opposing drum, F', and intervening indicating ribbon or belt, and the mechanism for releasing the escapement to set in operation the clock-work for the travel of the ribbon or belt, comprising a rock-shaft having an arm or arms for coming in contact with a fixed point without, and connections between said shaft and the pawl controlling the escapement, whereby the latter is thrown from its engagement, substantially as described.

2. In a station-indicator, the clock-work mechanism having the mainspring-arbor and the escapement-wheel controlled by a pawl, in combination with the drum F, connected with the arbor, so as to be thrown into and out of gear therewith, the drum F', on which the ribbon is wound, the removable crank-shaft to which said drum is connected, the indicating ribbon or belt H, wound on the drum F' and connected with the drum F, and the mechanism for releasing the escapement to set in operation the clock-work for the travel of the ribbon or belt, comprising a rock-shaft having an arm or arms for coming in contact with a fixed point without, and connections between said shaft and the pawl controlling the escapement, whereby the latter is thrown from its engagement, substantially as described.

3. In a station-indicator, the clock-work mechanism having the mainspring-arbor and the escapement-wheel controlled by a pawl, in combination with the drum F on the mainspring-arbor, the opposing drum, F', and the intervening indicating ribbon or belt, and the means for relieving the escapement, for the purpose described, comprising the rock-shaft E, having an arm, $e'$, for controlling the escapement-pawl, and a crank, $e^2$, an oscillating shaft having an arm or arms for coming in contact with a fixed point without, and a connection between said shaft and the crank $e^2$ of the rock-shaft E, whereby the escapement is effected and the indicating-ribbon is caused to travel, substantially as and for the purpose described.

4. In a station-indicator, a casing, a clock-work mechanism therein having a mainspring-arbor and an escapement-wheel controlled by a pawl, in combination with an indicating device operated by the clock-work mechanism, a rock-shaft under the car, having an arm or arms adapted to come in contact with a fixed obstruction in the road-bed, a rock-shaft, E, in the casing above, having an arm by which the escapement mechanism is relieved of its pawl, and a connection between the rock-shaft below and the rock-shaft above, whereby the latter is operated, substantially as described.

5. In a station-indicator, the casing, and a clock-work mechanism in the casing, having a mainspring-arbor and an escapement-wheel controlled by a pawl, in combination with the drum F on the mainspring-arbor, a second drum, F', and intervening indicating ribbon or belt, H, the rock-shaft K under the car, having a crank, $k$, and arms L, adapted to come in contact with fixed obstructions in the roadway, the rock-shaft E in the casing above, having an arm, $e'$, for releasing the pawl of the escapement, and a crank, $e^2$, and a connection between the cranks of the two rock-shafts, substantially as described.

6. In a station-indicator, a casing in the car, and a clock-work mechanism in the casing, having a mainspring-arbor and an escapement-wheel controlled by a pawl, in combination with the drum F on the mainspring-arbor, the opposing drum, F', and intervening indicating-ribbon, H, and the means for releasing the escapement, whereby the ribbon is operated, consisting of the rock-shaft K under the car, having a crank, $k$, and arms L, with joints $l$, adapted to move in but one direction, said arms coming in contact with fixed obstructions in the roadway, a rock-shaft, E, in the casing above, having an arm, $e'$, adapted to release the pawl of the escapement mechanism, and a crank, $e^2$; and the connection $k'$ between the cranks of the two rock-shafts, substantially as described.

7. In a station-indicator, the casing A, the clock-work mechanism C therein, having a mainspring-arbor, $c$, and an escapement mechanism controlled by a pawl, in combination with the drum F on the arbor, an opposing drum, F', on a crank-shaft, G, and intervening indicating-ribbon, H, a gong, I, a hammer, J, having a shank, $j$, a rock-shaft, $j'$, to which said shank is secured, said shaft having an arm, $j^2$, and a pin-wheel, $c^3$, in the clock-work mechanism, whereby the hammer is operated, and the means for releasing the escapement for the operation of the indicating-ribbon and the striking of the gong, consisting of a rock-shaft having an arm adapted to come in contact with a fixed obstruction without, and a connection between said rock-shaft and the pawl controlling the escapement, whereby said pawl is relieved, substantially as described.

In witness whereof I have hereunto set my hand.

GERRIT H. BADE.

Witnesses:
S. H. NOURSE,
H. C. LEE.